United States Patent Office 3,116,327
Patented Dec. 31, 1963

3,116,327
γ-DIMETHYLAMINOPROPYL ISOTHIOUREA AND ACID ADDITION SALTS THEREOF
Nicholas J. Kartinos, Niles, Ill., assignor to Baxter Laboratories, Inc., Morton Grove, Ill., a corporation of Delaware
No Drawing. Filed July 22, 1960, Ser. No. 44,577
3 Claims. (Cl. 260—564)

The present invention relates to novel chemical compounds. More particularly, it relates to the novel compound γ-dimethylaminopropyl isothiourea and its acid addition salts.

γ-Dimethylaminopropyl isothiourea may be represented by the formula:

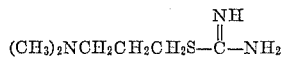

$$(CH_3)_2NCH_2CH_2CH_2S-\overset{\overset{NH}{\|}}{C}-NH_2$$

This compound and its acid adddition salts are surprisingly useful in inducing hypotensive conditions in laboratory animals which, having been so conditioned may then be used as subjects for the screening of candidate hypertensive drugs. In addition, this novel compound and its pharmaceutically acceptable acid addition salts show promise as therapeutic products for the treatment of hypertensive conditions.

The novel compound γ-dimethylaminopropyl isothiourea, may be conveniently prepared by reacting γ-dimethylaminopropylchloride hydrochloride with thiourea under reflux conditions in a suitable organic solvent. The dihydrochloride salt which forms is readily converted to γ-dimethylaminopropyl isothiourea by neutralizing the salt with a suitable alkali such as sodium hydroxide, potassium hydroxide, barium hydroxide or the like.

The preparation of the novel compounds of the present invention is further illustrated by reference to the following example.

*Example I*

γ-Dimethylaminopropylchloride hydrochloride (17.49 g.) was dissolved in 50 ml. of 95% ethanol. To this mixture was added 7.6 g. of thiourea. The combined reaction mixture was heated under the reflux for two hours. Acetone was gradually added to a cloud point and the mixture was allowed to cool. The crude product separated as white crystals, 15.9 g., M.P. 153–160° C. Purification was effected by crystallization from 250 ml. of n-propyl alcohol. There resulted 12.3 g. of a white crystalline product, γ-dimethylaminopropyl isothiouronium dihydrochloride, M.P. 161–163° C. (55% of theory).

*Analysis.*—Calcd. for $C_6H_{17}Cl_2N_3S$: N, 17.94; Cl, 30.28. Found: N, 18.08; Cl, 30.72.

The γ-dimethylaminopropyl isothiouronium dihydrochloride was converted to γ-dimethylaminopropyl isothiourea by careful neutralization with aqueous sodium hydroxide.

The dihydrochloride salt and the free base were then incorporated into oral and parenteral dosage forms. When administered to laboratory animals by either the oral or parenteral route a sustained depressor response was obtained.

A wide variety of acid addition salts of dimethylaminopropyl isothiourea may be prepared by reacting the free base form with a suitable organic or inorganic acid in the presence of a suitable solvent, such as a lower alkanol, e.g. ethanol, or isopropanol, or an ether, all of which may be removed by evaporation to obtain the crystalline salt.

The preferred salts are those acid addition salts of dimethylaminopropyl isothiourea with the mineral acids e.g. sulfuric acid, hydrochloric acid, phosphoric acid and the like, and a wide variety of organic acids, e.g. lower aliphatic hydrocarbon mono and dicarboxylic acids such as acetic, propionic, succinic etc.; lower aliphatic hydroxy hydrocarbon di and tri carboxylic acids such as tartaric and citric; the amino acids, and the like. These salts may be used in the preparation of a wide variety of therapeutic dosage forms, as, for example, capsules, powders, tablets and solutions.

While for purposes of illustration specific conditions have been described it is to be understood that a wide variety of modifications and changes may be made without departing from the spirit and scope of the present invention.

The embodiments of the invention in which an exclusive property or privilege is claimed are the following:
1. A composition of matter selected from the class consisting of γ-dimethylaminopropyl isothiourea and its acid addition salts with pharmaceutically acceptable acids.
2. γ-Dimethylaminopropyl isothiourea.
3. γ-Dimethylaminopropyl isothiouronium dihydrochloride.

References Cited in the file of this patent

UNITED STATES PATENTS

| | | |
|---|---|---|
| 1,723,696 | Hahl et al. | Aug. 6, 1929 |
| 2,648,710 | Morrison et al. | Aug. 11, 1953 |
| 2,890,224 | Schneider | June 9, 1959 |
| 2,894,030 | Winthrop | July 7, 1959 |

OTHER REFERENCES

Renshaw et al.: J. Amer. Chem. Soc., vol. 60 (1938), pages 1765–70.

Shapira et al.: Radiation Research, vol. 7, pages 22–34 (1957).

Khym et al.: J.A.C.S., vol. 80, pages 3342–3349 (1958).

Schoberl et al.: Ber. Deut. Chem., vol. 91, pages 1239–1241 (1958).

Hansen: Acta Chem. Scand., vol. 13, pages 151-158 (1959) QD1A 32).

Doherty et al.: J. Amer. Chem. Soc., vol. 79, pages 5667–71 at 5670.